May 4, 1965 R. I. SWANSON 3,181,672
TENSION CONTROL WRENCH
Filed June 20, 1961 2 Sheets-Sheet 1

INVENTOR.
ROGER I. SWANSON
BY Peter J. Murphy
ATTORNEY

May 4, 1965  R. I. SWANSON  3,181,672
TENSION CONTROL WRENCH
Filed June 20, 1961  2 Sheets-Sheet 2

INVENTOR.
ROGER I. SWANSON
BY Peter J. Murphy
ATTORNEY

United States Patent Office 3,181,672
Patented May 4, 1965

3,181,672
TENSION CONTROL WRENCH
Roger I. Swanson, Spring Lake, Mich., assignor to Gardner-Denver Company, a corporation of Delaware
Filed June 20, 1961, Ser. No. 118,314
21 Claims. (Cl. 192—.096)

This invention relates to impact wrenches, and more particularly to impact wrenches having means for uniformly controlling the clamping force, or tension, in threaded fasteners.

The common forms of threaded connections are those wherein a nut is threaded onto a bolt or stud, or a bolt is threaded into an assembly, for the purpose of clamping an assembly. The following will refer primarily to nut-bolt type connections; however, the principles to be discussed apply, as well, to other types of threaded connections. In such nut tightening operations, it is important that the proper degree of tightness be achieved and, further, that the tightness of a plurality of bolts in a single assembly be uniform so that the load is uniformly distributed and that no one bolt carries more than its share of the load. If a bolt is understressed, the external loading of the assembly (a fluctuating load or a shock load which the assembly is designed to support) may cause the connection to loosen or may cause fatigue failure of the bolt. If a bolt is overstressed to a point beyond its capacity, the bolt may rupture during tightening or may be otherwise damaged so that an early failure will result.

Normally, an impact wrench delivers impact power by a series of intermittent torque impulses transmitted through a tool head (socket) which is integral with an anvil element of the wrench. Assuming the load to be a nut which is to be tightened, the ultimate torque obtainable is limited either by the strength of the bolt material or by the maximum output energy which is transmitted from the wrench to the nut. Provided the strength of the bolt is not exceeded, the ultimate torque obtainable with a given impact wrench occurs when no further turning of the nut is possible, and the entire energy output of each torque impulse is absorbed either in elastic reaction of the bolt or in elastic deflection or distortion of the torque transmitting member.

Heretofore, many types of mechanisms have been proposed for controlling the clamping force of threaded connections by attempting to control the torque output of the wrench applied to turn a nut or bolt. Many of these mechanisms employ means for shutting off the tool or disengaging the tool clutch when the preselected torque output has been achieved. Some of these mechanisms have proven to be very effective in applying torque to threaded connections within arrow torque limits. However, careful study of the entire problem of threaded fasteners, and the desideratum of a controlled tension or clamping force in a threaded connection, has shown that the amount of torque applied to a nut or bolt is a very inaccurate measure of the tension or clamping force achieved in the connections.

Experimentation has established that as much as 90 percent of the torque applied to a threaded connection may be absorbed in frictional losses between mating faces and between mating threads. Such frictional losses vary widely since they are affected by surface conditions such as lubrication, burrs and rust, and by damaged threads. It is difficult, if not impossible, to control these conditions from the standpoints of both practicality and cost. Consequently, in using an impact wrench which will shut off in response to a predetermined torque applied, the probable result is that individual threaded connections in an assembly will range from understressed to overstressed, even though torque readings may be within an accepted range.

In arriving at the hereinafter described improved method for positively controlling the clamping force in a threaded connection, it has been observed that bolt stretch constitutes a constant and accurate means by which to measure clamping force. In stretching the bolt, the bolt is put in tension; and, within the elastic limit of the bolt, such bolt tension is proportional to bolt elongation. Since the force necessary to stretch a bolt a preselected amount may be determined, the bolt tension, hence the clamping force of a threaded connection, may be accurately controlled by an impact wrench, provided that the ultimate energy output of the wrench is just sufficient to stretch the bolt the desired amount.

To achieve a constant and uniform bolt tension by control of the ultimate energy output of the wrench, the angular momentum of each impulse blow imparted by the wrench must be the same. Therefore, certain physical and dynamic characteristics must be designed into the wrench in order to achieve uniform angular momentum: (1) The mass which is accelerated to produce the impact blow must be constant. (2) The mass must act on a constant moment arm during acceleration and impacting. (3) The face engagement of the impacting surfaces must be constant. (4) The acceleration of the mass and the angular velocity of the mass at the moment of impact must be constant. If a wrench has these desired features, enabling it to deliver a constant angular momentum to a threaded connection, accurate bolt tension can be readily achieved.

The importance of providing a wrench capable of producing blows of constant angular momentum can be appreciated when it is considered that the nut, having helical threads, acts as a wedge between the threads of a mating bolt and the surface of the assembly against which the nut bears. When a rotational or torque impulse is imparted to the nut, this wedging characteristic of the nut creates a force component tending to elongate, or lift, the bolt which is many times greater than a created force component tending to rotate the bolt. This concept is illustrated in FIGURE 8 of the accompanying drawing wherein there is shown a wedge W representing the nut. The vector E represents the force of the impulse blow imparted to the nut by the wrench, and the vector E' represents the resultant force imparted to the bolt. The vector S represents the force component tending to elongate the bolt, and the vector R represents the force component tending to rotate the bolt.

The resultant "impulse stretching" of the bolt, along with vibration imparted by the impact blow, tends to reduce the inherent friction between the parts, thereby permitting the rotational force component R to rotate the nut with respect to the bolt relatively independently of the above mentioned friction variables. The bolt is then stretched, or prestressed, a certain amount depending on the amount of nut rotation. With each turning of the nut, during the "impulse stretching" of the bolt, the bolt is stretched an additional amount. Eventually, the bolt tension, or clamping force of the connection, will balance the ultimate energy output of the wrench; and, further impact blows of the wrench will effect no further turning of the nut, hence no further increase in bolt tension.

It follows that, if the angular momentum of each impulse blow of the wrench is the same, the resultant prestress, or tension, in each bolt of a multi-fastener assembly will be the same. If the bolts in an assembly have been prestressed to a load above the external loading of the assembly, the bolts cannot fail from fatigue because there will be no further change in the stress of the bolt. Further, since there is no change in bolt stress, there is no tendency for the nut to loosen on the bolt. The resultant connection is the ultimate that may be achieved with threaded fasteners.

Along with the above described features, a practical tension control wrench should be readily adjustable so that the ultimate energy output of the wrench may be selected or preset over a practical range. This may be accomplished through adjustable and accurate control of the energy input to the driving motor, providing control of the acceleration and angular velocity of the impacting mass.

For some applications of threaded connections, it is specified that the bolt may be stretched beyond the yield point into the plastic range. A wrench having the above described features may be employed to stretch a bolt to any point up to the point of ultimate stress (stress-strain curve), since the ultimate energy output of the wrench may be preset to balance the stress.

Accordingly, a primary object of this invention is to provide an impact wrench which will produce a uniform clamping force in threaded fasteners by producing uniform bolt tension.

Another primary object of this invention is to provide an impact wrench which will produce a uniform energy output for each impact blow.

Another object of this invention is to provide an impact wrench having means for selecting the ultimate energy output over a wide range.

A further object of this invention is to provide an impact wrench which will produce uniform bolt tension regardless of the normal friction resistance found in threaded fasteners.

A still further object of this invention is to provide an impact wrench which will produce uniform bolt tension, and provide a positive signal for indicating that the desired bolt tension has been achieved.

A still further object of this invention is to provide a reversible impact wrench which will provide uniform controlled energy output in one direction of rotation and full energy output in the reverse direction of rotation, or which may provide uniform controlled energy output for either direction of rotation.

A still further object of this invention is to provide an air operated impact wrench which will produce a constant energy output regardless of pressure variations in the air supplied to the tool.

A still further object of this invention is to provide an air operated impact wrench wherein the air for operating the impact clutch mechanism and the air for driving the motor are independently controlled.

A still further object of this invention is to provide an impact wrench having both a direct drive clutch and an impacting clutch, between the motor and the anvil, and having means for alternatively actuating the clutch drive for the anvil.

A still further object of this invention is to provide an impact wrench for producing uniform bolt tension, featuring a rugged and simple structure requiring a minimum of maintenance.

The novel features of this invention, as well as additional objects and advantages thereof, will be understood more fully from the following description when read in connection with the accompanying drawings in which.

Figure 1:
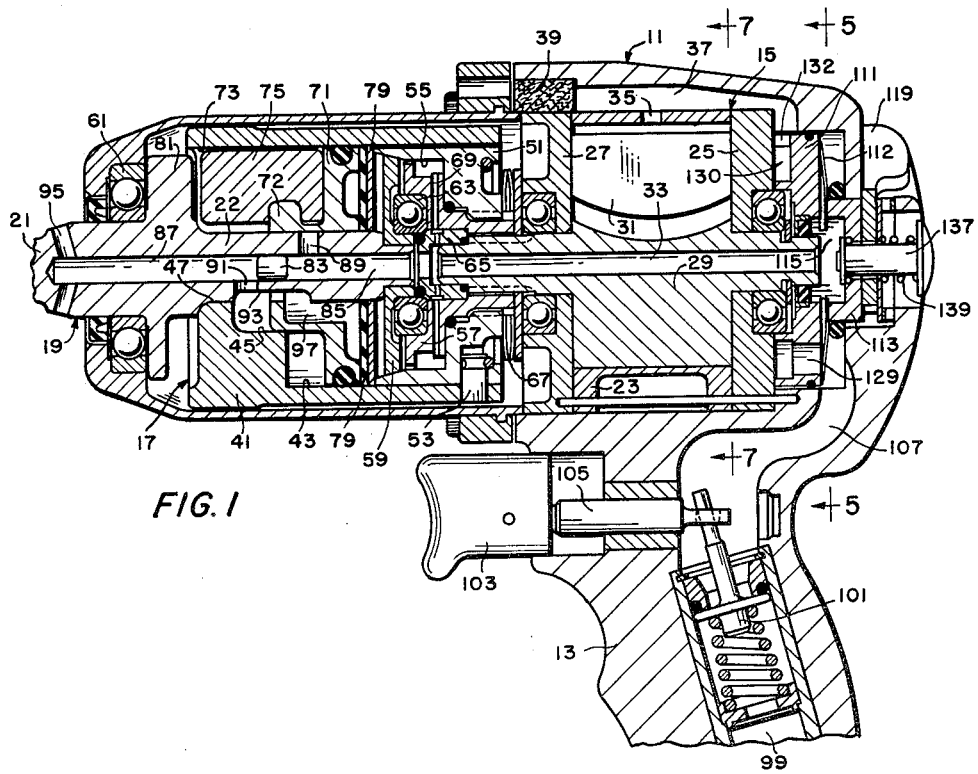
FIGURE 1 is a longitudinal sectional view of a wrench according to the present invention.
Figure 2:
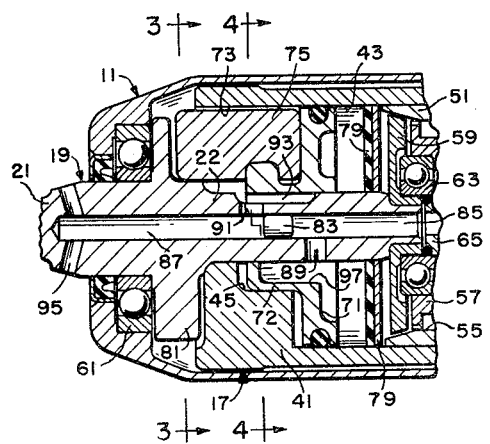
FIGURE 2 is a partial longitudinal sectional view, related to FIGURE 1, showing certain parts of the wrench mechanism in different relative positions.

With reference to the drawings, the general arrangement of an illustrative tool, embodying the above mentioned features, is best shown in FIGURES 1 and 2. This tool is operated by pressurized air, or other pressure fluid. The tool is generally enclosed by a housing 11 having an integral, pistol-grip handle 13. A rotary vane air motor 15 is mounted in the rearward portion of the housing (shown at the right in FIGURE 1) and drives a hammer assembly 17, mounted in the forward portion of the housing 11. An anvil 19, mounted in the forward portion of the housing for driving engagement with the hammer assembly, includes a portion extending from the forward end of the housing which may include a square drive 21, to which a socket may be attached, and a shaft portion 22 extending into the hammer assembly.

The motor 15 includes a housing defined by cylinder 23, rearward end plate 25, and forward end plate 27, all of which are fixed within the housing 11. A rotor 29 includes forward and rearward journals rotatably supported in suitable bearings in the end plates, the forward journal defining a splined drive shaft. The rotor is provided with a plurality of radial slots, within which are positioned sliding vanes 31 for engagement with the cylinder 23. The rotor is provided with an axial passage 33 extending therethrough. Primary exhaust air from the motor passes through a cylinder opening 35 into a chamber 37, defined by the housing 11 and the motor housing, thence through a muffling element 39 to atmosphere. The controls for the motor, and for the tool generally, will be described subsequently.

The hammer assembly 17 includes a clutch body 41, in the form of a cylindrical member having a large rearward facing bore 43, an intermediate bore 45 extending forwardly from the large bore 43, and a small bore 47 opening from the forward end of the clutch body for receiving the anvil shaft 22.

A clutch driver 51 is disposed within the large bore 43, at the rearward end of the clutch body, and is rigidly coupled to the clutch body by a plurality of drive pins 53. The clutch driver has a large forward facing bore 55 and a smaller bore extending therethrough, which is internally splined. Received within the driver bore 55 is a piston 57 having a rearwardly extending boss which is externally splined for engagement with the internally splined bore of the clutch driver, and having an axial bore which is internally splined for engagement with the splined rotor drive shaft. It will be seen then that the clutch body 41 is directly driven by the rotor 29 through the piston 57, the clutch driver 51, and the drive pins 53. The forward periphery of the clutch driver bore 55 is beveled to define the driving member of a cone clutch.

The anvil shaft 22 extends through the clutch body 41 into the driver bore 55, and has a cone 59 nonrotatably fixed at its rearward end for engagement with the beveled portion of the clutch driver 51 and defining the driven member of the cone clutch. The anvil is mounted for rotation at the forward end of the housing 11 in a bearing 61, in a manner to prevent axial movement thereof. A bearing 63 is provided between the cone 59 and the piston 57 to provide for relative rotation and axial alignment of these members, and to axially confine the piston 57. An O-ring retainer 65 is axially confined between the anvil shaft 22 and the piston 57, and provides for sealing between these members, the cone 59, and the rotor 29. The anvil and the O-ring retainer are provided with axial passages which communicate with the rotor passage 33.

Conical disc springs 67 are provided between the clutch driver 51 and the forward motor end plate 27 to bias the clutch driver and the clutch body 41 forwardly, relative to the cone 59, to engage the cone clutch. Radial passages 69, in the piston 57, and the O-ring retainer 65, communicate the chamber defined by the piston 57 and the clutch driver bore 55 with the axial passage provided in the anvil shaft 22, the O-ring retainer 65, and the rotor passage 33. When sufficient air pressure has built up within this axial passage, this pressure will move the clutch driver and clutch body rearward, relative to the cone 59, against the pressure of the disc springs 67 to disengage the cone clutch. The purpose of the cone clutch will be described subsequently.

A piston 71 is disposed within the large bore 43 of the clutch body, in sealing engagement therewith, and includes a forwardly extending boss 72 which is received within the intermediate bore 45 of the clutch body 41. The clutch body is provided with five circumferentially spaced bores, best shown in FIGURE 4, aligned parallel with the axis of rotation, which extend forwardly from the large bore 43 and communicate laterally with the intermediate bore 45. Of these bores, a bore 73 extends through the forward end of the clutch body and has received therein a cylindrical hammer pin 75. The hammer pin and the piston boss 72 are provided with complementary notches, best shown in FIGURES 2 and 4, coupling these members so that axial movement of the piston 71 imparts corresponding axial movement to the hammer pin, and so that rotational movement of the clutch body is transmitted through the hammer pin to the piston 71. The remaining four circumferentially spaced bores 76, in the clutch body, do not extend through the forward end of the body and have disposed therein coil springs 77 which bear against the forward face of the piston 71 to bias the piston rearwardly. The rearward limit of piston movement is defined by washers 79 which bear against the clutch driver, one of which is a sealing washer, defining an air chamber behind the piston 71. The piston is provided with an axial bore which is dimensioned to snugly receive cylindrical shaft 22 of the anvil 19; and these members define a valve, functioning through relative rotation of the members, to direct air to the chamber behind the piston and to exhaust air from this chamber. The shaft 22 is sealed by the sealing washer 79 to define the closed air chamber behind the piston 71.

Figure 3:
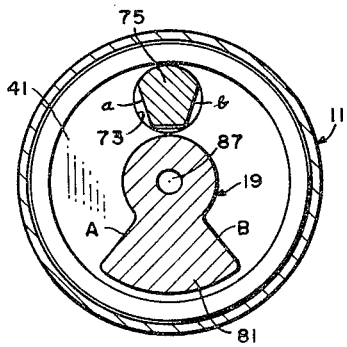
FIGURE 3 is a transverse sectional view taken along the line 3—3 of FIGURE 2, looking in the direction of the appended arrows.

The anvil 19 includes a radial flange intermediate its ends, which carries an integral rearwardly extending boss 81, best shown in FIGURES 2 and 3, defining impact receiving surfaces A and B which lie in radial planes. The forward end of the hammer pin 75 is milled to define impact delivering surfaces a and b, best shown in FIGURE 3, which lie in radial planes and which engage the anvil surfaces A and B, respectively, depending upon the direction of rotation of the clutch body with respect to the anvil.

When the piston 71 is biased to its rearwardmost position by the springs 77, as shown in FIGURE 1, the hammer pin 75 is retracted into the clutch body so that its rotational path clears the boss 81. When air is directed to the chamber behind the piston 71, the piston is urged forward to positively extend the hammer pin from the clutch body to effect engagement of the above discussed impacting surfaces, as shown in FIGURE 2. The above described clutch body 41, piston 71, hammer pin 75, and springs 77 to define the impact clutch, the operation of which is controlled by the valve now to be described.

The valve for controlling the movement of piston 71 consists of the anvil shaft 22 and the piston 71. The anvil shaft is provided with an axial passage extending to a point adjacent its forward end. Intermediate the ends, this passage is sealed by a plug 83 to define a rearward passage 85 and a forward passage 87. Rearward passage 85 is in communication with a source of pressurized air through the rotor passage 33, as will be described. Rearward of the plug 83, the shaft 22 is provided with a radial passage 89 communicating with the passage 85. Forward of the plug 83 the shaft is provided with a radial passage 91 communicating with the passage 87 and directed 180° from radial passage 89. The shaft is provided with a transverse flat 93 communicating with the radial passage 91. Adjacent the forward end of the anvil, generally radial ports 95 communicate the passage 87 with atmosphere. The bore of the piston 71 is provided with a longitudinal groove 97 extending from the rearward face of the piston to a point adjacent the forward end of the boss 72.

In FIGURE 1, the hammer pin 75 is shown in the retracted position directly over the anvil boss 81. In this position, the piston groove 97 is radially aligned with the radial passage 91 and the flat 93. Therefore, the chamber behind the piston is communicated with atmosphere through the flat 93 and the passages 91, 87 and 95. The radial passage 89 is sealed by the piston 71. This position of the hammer pin 75 with respect to the anvil boss 81 is occupied immediately following each impact blow, and as the clutch body has begun to accelerate. The springs 77, then, have moved the piston and hammer pin rearward to the retracted position.

Figure 4:
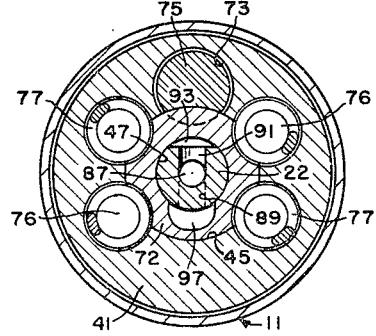
FIGURE 4 is a transverse sectional view taken along the line 4—4 of FIGURE 2, looking in the direction of the appended arrows.
Figure 8:
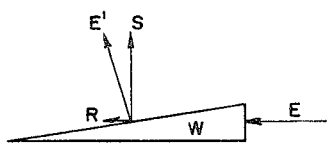
FIGURE 8 is a diagram illustrating the forces acting in a threaded fastener.

FIGURES 2, 3 and 4 show the anvil rotated 180° from the position shown in FIGURE 1, and relative to the hammer pin. In this position, the flat 93 is sealed by the piston 71 so that the chamber behind the piston is sealed from atmosphere. The radial passage 89 is now radially aligned with the piston groove 97 so that pressurized air has been directed to the chamber behind the piston, and the piston and the hammer pin are in the forward position wherein the pin is extended to place the impact delivering surfaces a and b in the rotational path of impact receiving surfaces A and B.

With particular reference to FIGURES 3 and 4 it will be seen that, from this position, the hammer pin must be rotated more than 90° relative to the anvil before impact. It will further be seen that the passage 89 will be sealed by the piston before this amount of rotation has been accomplished. The chamber behind the piston will then be sealed for a time to retain the pin in the extended position. It will further be seen that after about 90° of rotation from the indicated position, which will be slightly before impact, the flat 93 will communicate with the piston groove 97 to communicate the chamber behind the piston with atmosphere slightly before the moment of impact. This is necessary so that the piston will move rearward immediately following the impact blow, to permit the pin 75 to clear the boss 81 for the succeeding cycle. It will also be observed that the valve will function identically for either direction of rotation of the clutch body with respect to the anvil; therefore, the impact clutch functions identically for either direction of rotation.

Figure 5:
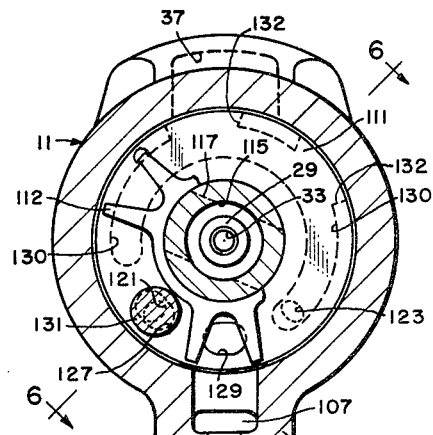
FIGURE 5 is a transverse sectional view taken along the line 5—5 of FIGURE 1, looking in the direction of the appended arrows.
Figure 6:
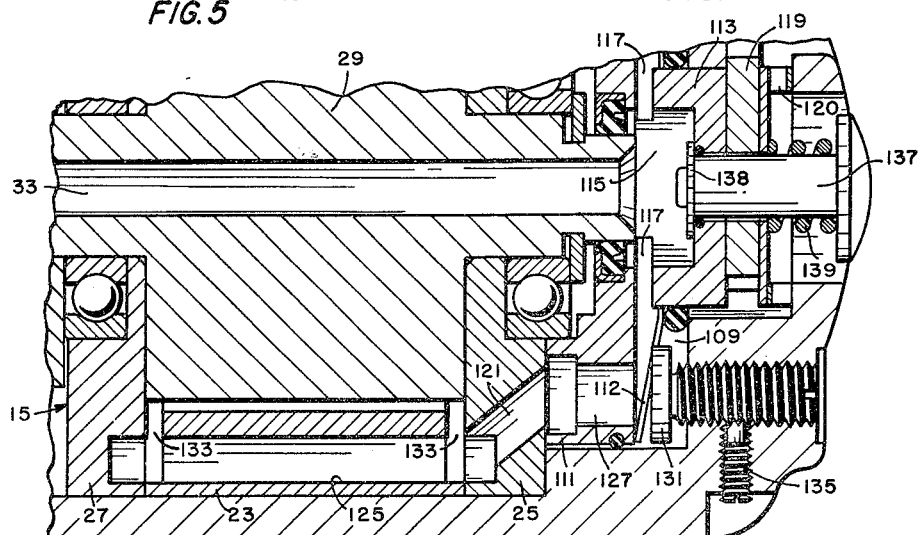
FIGURE 6 is a partial longitudinal sectional view taken along the line 6—6 of FIGURE 5, looking in the direction of the appended arrows.

The tool is connected to a suitable air supply through a conventional coupling (not shown) at the end of the handle 13. Air is directed through a handle chamber 99 to a conventional throttle valve 101 which is spring biased to seated position. The throttle valve, which functions as an on-off valve, is actuated by a trigger member 103 and associated plunger 105. From the throttle valve, air is directed through a passage 107 to a chamber 109 (FIG. 6) defined by the housing 11 and a disc-like reversing valve 111 which lies against the rearward end plate 25 of the motor. The reversing valve is urged against the end plate by a spring 112, which is locked for rotation with the valve. As best shown in FIGURES 1, 5 and 6, the reversing valve is provided with a rearwardly extending central boss 113 and a forward facing central bore 115 which extends into the boss and which receives the rearward journal of the rotor 29. The bore 115 is communicated with the chamber 109 by means of slots 117, so that the bore and chamber 109 effectively define a single air chamber, which will be referred to hereafter as the air supply chamber 109. The rearward end of the boss is provided with a transverse groove for receiving an elongated reversing lever 119 by means of which the reversing valve is rotationally positioned for forward or reverse rotation of the motor. The reversing lever is retained in the groove by means of a spring 120.

As best shown in FIGURE 5, the rearward motor end plate 25 is provided with intake passages 121 and 123 which communicate with respective cylinder passages 125 to either direct air to the motor or to provide secondary exhaust from the driven side of the motor. The reversing valve 111 is provided with longitudinal ports 127 and 129 which communicate the chamber 109 with the motor passages 121 and 123, respectively. In the drawings, the reversing valve is shown rotated to a position to drive the motor in a forward direction, for example, wherein the valve port 127 overlies the motor passage 121 to communicate this passage with the supply chamber 109. The valve port 129 serves no function in this position. The valve 111 is provided with a forward facing arcuate groove 130, which is selectively communicated with the motor intake passages 121 and 123, and radial openings 132 opening from the groove 130 to communicate the groove with housing exhaust chamber 37, as best shown in FIGURES 1 and 5. In the drawings, the motor intake passage 123 is communicated with the groove 130 to provide secondary exhaust of air from the driven side of the motor. When the reversing valve is rotated to the reverse position, the motor passage 123 is communicated with the supply chamber 109 and the motor passage 121 is communicated with the exhaust chamber 37. The reversing valve ports 127 and 129 have no function in regard to secondary exhaust.

Figure 7:
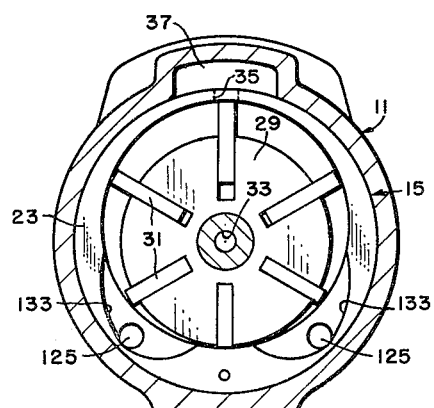
FIGURE 7 is a transverse sectional view taken along the line 7—7 of FIGURE 1, looking in the direction of the appended arrows.

It should be noted that the chamber 109 serves as an air supply chamber both for the motor 15 and for the impact clutch. Air flow from the chamber 109 to the motor is controlled by a velocity control valve 131, best shown in FIGURES 5 and 6, which consists of a screw having a head of enlarged diameter. The valve head has a surface parallel with the rearward face of the reversing valve 111 and a diameter sufficient to cover the reversing valve port 123. The valve 131 is threaded in a rearward opening tapped hole in housing 11; and is adjustable relative to the face of the reversing valve to control the flow of air from the chamber 109 to the motor, and particularly, to control the velocity pressure of the air flowing into the motor cylinders, as opposed to the static pressure of the air supplied by the air source. It is the control of the velocity pressure of the air to the motor which provides for the accurate control of input energy to the motor and, hence, the angular velocity of the motor and of the clutch body 41. In order to maximize the effect of the velocity pressure, the air passages in the motor housing are designed to provide minimum restriction to flow. As best shown in FIGURES 6 and 7, the air directed to the motor cylinder passage 125 is directed into the cylinder chamber through open slots 133 which are milled in the ends of the cylinder 23.

The control of velocity pressure of air to the motor is extremely important to the purpose of uniform acceleration and angular velocity and, hence, uniform angular momentum of the impacting mass. It is well known that, in an assembly plant, the pressure of the air supply is subject to fluctuation since many air tools or other appliances may be connected to the supply and are operated intermittently. This pressure fluctuation causes considerable variation in the energy output of tools connected to the supply. Normally, tools of this type are designed to operate at an air pressure of 90 p.s.i. Tools according to the present invention have been tested for energy output at supply pressures ranging from 70 p.s.i. to 110 p.s.i. It has been observed that the energy output of the tools varies insignificantly through this range of supply pressures, when the above described velocity control valve is used. These tests have established that velocity pressure control is an important factor in the maintaining of uniform angular momentum or energy output for these tools.

The velocity control valve 131 may be readily adjusted, by means of a screw driver, for example, to preset the valve for a particular energy input to the motor, hence energy output for the tool. After appropriate adjustment of the velocity control valve, this valve is locked in position by means of a set screw 135 having a tip of nylon, for example, to prevent damage to the threads of the velocity control valve. Air flow from the supply chamber 109 to the impact clutch and to the cone clutch is controlled by a clutch control valve 137. As previously described, the cone clutch, defined by the clutch driver 51 and the cone 59, is normally biased into engagement by the disc springs 67, to provide a direct drive between the clutch driver and the anvil 19. The cone clutch will remain engaged until the pressure within the passages 33 and 85 has built up sufficiently to move the clutch driver rearwardly against the spring pressure to disengage the cone clutch. The designed spring pressure is such that the cone clutch may not be disengaged until the pressure within the passage 85 is sufficient to positively actuate the piston 71 and fully extend the hammer pin 75 for full and positive engagement with the anvil boss 81. The cone clutch, then, provides a safety device to prevent spalling or other damage to the impacting surfaces of the hammer pin and the anvil, which may result from partial extension of the hammer pin; and further, the cone clutch assures that the impacting surface area of the hammer pin and of the anvil boss will be the same for each impulse below. Since the air supply to the impact clutch is independent of the air supply to the motor, full line pressure is available to operate the impact clutch regardless of the setting of the velocity control valve 131. This assures full engagement of the impacting surfaces regardless of the energy output setting for the tool. Full engagement of the impacting surface is further assured by the fact that the piston 71 and hammer pin 75 are extended into engaging position positively by air pressure, and are retracted from engaging position by the springs 77.

In some fastener applications, the desired technique is to turn a nut down on a bolt to "finger tightness" and then to turn the nut an additional predetermined number of degrees which is calculated to achieve bolt tension within a desired range. The clutch control valve 137 particularly adapts the tool for this application. This valve consists of a headed shaft disposed in axially aligned openings in the reversing valve 111 and the reversing lever 119, and aligned with the rotor passage 33. The forward end of the valve shaft extends into the reversing valve bore 115 and has fixed thereon a sealing washer 138 which retains the valve within the assembly. The headed end of the valve is biased rearwardly by a spring 139 and extends through an opening in the housing 11. This valve may be selectively actuated to move the washer 138 against the end of the rearward rotor journal to seal the rotor passage 33 with respect to the supply chamber 109. When the rotor passage 33 is sealed, the cone clutch will remain engaged while the motor may be operated to rotate a nut through the direct drive of the cone clutch, the impact clutch being inoperative. When the valve 137 is released, the impact clutch will function as described. In this manner, the cone clutch may be employed to run a nut down to "finger tightness" and the impact clutch may then be employed to turn the nut an additional predetermined number of degrees through visual observation, for example.

It is believed that the operation of the described wrench is apparent from the foregoing description. The wrench may be readily set up for a desired energy output, with respect to a given fastener, in the following manner: The first step is to assemble a nut and bolt, in the assembly to be fastened, and to determine the yield point of the bolt. This is accomplished by using a torque wrench and slowly tightening the nut until the torque levels out. The indication that the "yield point" of the bolt has been reached is when the indicated torque ceases to increase. The torque reading on the wrench has no bearing on the tool calibration, since the torque wrench is used merely as a means for determining the yield point of the bolt. Next, remove the torque wrench and mark the rotational position of the nut in relation to the assembly. Then back the nut off approximately one-half turn. Finally, adjust the velocity control valve 131 at a selected setting for low energy output. Place the wrench on the nut and impact until there is a loss of rotation. If the marks are not aligned, adjust the valve to increase energy output to a point where the wrench will turn the nut forward to the marked position (yield point), and will impact the nut five or more seconds without turning beyond the marked position. The wrench is then adjusted to apply proper bolt tension to all bolts of the same size and type. Note that the wrench is set up, not to a predetermined torque output in terms of foot-pounds, but to an ultimate energy output just sufficient to produce desired bolt tension in a bolt of a particular size and type.

The following features of the above described wrench are important to the stated objects. The rotating mass which imparts the impact blow to the anvil consists of all of the rotating parts of the tool with the exception of the anvil. The hammer pin 75 and the piston 71 are moved axially with respect to the clutch body, and there are no parts of the tool assembly which move radially with respect to the axis of rotation; therefore, the mass is accelerated and rotated on a constant moment arm.

The impacting surfaces, a and b of the hammer pin, and A and B of the anvil, lie in radial planes with respect to the axis of rotation. The hammer pin is moved forwardly, for engagement with the anvil, by positive acting air pressure. Further, the air directed to the impact clutch mechanism is independent of the air directed to the motor so that control of the air to the motor has no effect on the operation of the impacting mechanism. The cone clutch provides a safety device whereby relative rotation between the hammer pin and the anvil cannot occur until the air pressure has built up sufficiently to positively and fully extend the hammer pin, therefore, the opportunity for damage to the impacting surfaces is minimized. Because of these features, the face engagement of the impacting surfaces is constant and uniform providing for uniform transmission of force between the hammer pin and the anvil boss.

The velocity control valve 131 provides precise control of energy input to the motor, regardless of line pressure variations, since this valve primarily controls the velocity pressure of the air directed to the motor rather than the static pressure of air directed to the tool. Velocity pressure is controlled in part by the fact that the control valve is positioned as closely as possible to the motor vanes upon which the air is acting, and in part to the design of the passages for directing the air to the motor vanes. With uniform input energy to the motor, uniform acceleration and angular velocity of the rotating mass is assured in view of the other above mentioned features, i.e. constant mass and constant effective moment arm of the mass.

The impact clutch is controlled by air, independently of the air for driving the motor, and by springs 67; therefore, no energy is taken from, or returned to, the rotating mass for the purpose of actuating the impact clutch. No energy is taken from the rotating mass for the purpose of measuring the torque output of the wrench or for effecting the shut-off of the wrench when a predetermined torque output has been achieved. In general, there is no mechanism in the wrench which takes energy from, or returns energy to, the rotating mass and which would necessarily effect variable changes in the acceleration and angular velocity of the mass and defeat the desideratum of uniform angular momentum for each impact blow.

The above discussed features, acting in concert, provide a tool which will produce "uniform bolt tension." Lack of one or more of these features would likely reduce the uniformity of result.

Another important feature is the facility with which the velocity control valve 131 may be adjusted to provide "uniform bolt tension" for a wide range of bolt types and sizes. Adjustments of the control valve vary only the energy input to the motor and, hence, acceleration and angular momentum of the impacting mass. For each selected adjustment of the velocity control valve, the ultimate energy output of the wrench remains uniform.

It should be noted that while the input energy to the motor, in the above described wrench, is controlled for one direction of rotation, there is no restriction of energy output in the reverse direction of rotation. The velocity control valve 131 has no effect on exhaust flow of secondary air from the driven side of the motor and this air flows unrestricted to atmosphere. Hence, by merely rotating the reversing valve lever 119, the full energy available in the wrench may be used for loosening rusted or corroded nuts or bolts, for example.

A second velocity control valve may be readily provided to coact with the reversing valve and the motor intake passage 123 to provide control of input energy, hence output energy, for both directions of rotation. The two control valves may be individually adjusted for the desired energy output in each direction of rotation.

Another important feature of the invention is the simplicity of structure in a wrench which provides uniform bolt tension. Known impact wrenches which provide "torque control" are generally heavy and bulky tools, in relation to the rated output of the wrench. This is perhaps necessarily so since a relatively large proportion of the developed energy must be utilized to accomplish the measuring of the control of torque output for the purpose of shutting off the tool within the desired torque limits. Further, these "torque control" mechanisms are relatively complicated, requiring frequent adjustment and maintenance. Also, as discussed above, the control of torque output does not produce the desired result of "uniform bolt tension." Chips, burrs and dry or oily surface conditions, for example, produce conditions of variable friction and may present changing friction conditions during the threading of one fastener. Chips and burrs, particularly, may represent a momentary frictional resistance which balances the preset torque input in a "torque control" wrench and effects shut-off of the wrench long before desired bolt tension is attained. In a wrench according to the present invention, these variables will not effect resultant bolt tension since the wrench will continue to impact until the desired bolt tension is attained.

Another feature of the invention is that a positive signal is provided to indicate when the desired bolt tension is attained, namely, loss of rotation of the nut. It has been found, in practice, that this loss of rotation may also be indicated by a readily audible change in the sound created by the impacting.

Another feature of the invention is the provision of the cone clutch and of the clutch control valve 137, which renders the impact clutch ineffective to permit rundown of a nut or bolt through the cone clutch.

The primary advantage of a wrench according to the present invention is the ability to produce uniform or consistent bolt tension; a result not heretofore attained by known impact wrenches. Additionally, this is accomplished in a wrench having a simple mechanism with resultant savings in maintenance and repair.

A resultant principal advantage is that bolts may be consistently stressed to the yield point for maximum clamping force. Hence, bolts are used to their maximum design strength enabling use of the smallest bolts for a given assembly. It follows that, for a given assembly, smaller bolts and nuts may be used and smaller holes, hence smaller drills, taps and machines are required, all of which result in reduced cost of the assembly.

It has been found that, with a normal assembly design, bolts may be stressed to the yield point in less than one second, with a wrench according to the present invention. With soft conditions, such as warped parts or bent washers, the time necessary to attain desired stress may be longer. In any assembly, however, the predetermined bolt tension will be consistently attained.

What is claimed is:

1. In a rotary impact wrench:
an air motor; a rotatable impact delivering assembly, driven by said motor, having a radially disposed impact delivering member;
a rotatable impact receiving assembly having a radially disposed impact receiving member;
one of said impact members being mounted in its associated assembly for movement into and out of the path of the other of said impact members; impact clutch means in said one assembly for effecting said movement of said one impact member;
means defining an air supply chamber in said tool; said air motor having an air intake passage communicating with said air supply chamber; and a valve positioned adjacent to said motor intake passage for controlling the flow and velocity pressure of air directed from said supply chamber to said motor, to provide constant energy input to said motor.

2. In an air operated rotary impact wrench:
an air motor; a rotatable impact delivering assembly, driven by said motor, having a radially disposed impact delivering member;
a rotatable impact receiving assembly having a radially disposed impact receiving member;
one of said impact members being mounted in its associated assembly for longitudinal rectilinear movement into and out of the path of the other of said impact members; air actuated means in said one assembly for effecting said movement of said one impact member;
valve means defined by coacting valve elements rotated respectively with each of said impact assemblies, operative upon relative rotation thereof to control the air acting on said air actuated means;
and a valve positioned adjacent to said motor for controlling the flow and velocity pressure of air directed to said motor, independently of the air directed to said air actuated means, to provide constant energy input to said motor.

3. In an air operated rotary impact wrench:
an air motor; a rotatable impact delivering assembly, driven by said motor, having a radially disposed impact delivering member;
a rotatable impact receiving assembly having a radially disposed impact receiving member;
one of said impact members being mounted in its associated assembly for longitudinal rectilinear movement into and out of the path of the other of said impact members; air actuated means in said one assembly for effecting said movement of said one impact member;
valve means defined by coacting valve elements rotated respectively with each of said impact assemblies, operative upon relative rotation thereof to control the air acting on said air actuated means;
said air motor having an air intake passage; and a valve positioned adjacent to said motor intake passage for controlling the flow and velocity pressure of air directed to said motor, independently of the air directed to said air actuated means, to provide constant energy input to said motor.

4. In an air operated rotary impact wrench:
an air motor; a rotatable body driven by said motor;
a rotatable anvil having an impact receiving surface;
an impact element, having an impact delivering surface, mounted in said body for longitudinal rectilinear movement into and out of the path of said impact receiving surface of said anvil; air actuated means, in said body, for effecting said movement of said impact element;
valve means defined by coacting valve elements rotated respectively with said body and said anvil, operative upon relative rotation thereof for controlling the air acting on said air actuated means;
and a valve positioned adjacent to said motor for controlling the flow and the velocity pressure of air directed to said motor, independently of the air directed to said air actuated means, to provide constant energy input to said motor.

5. In an air operated rotary impact wrench:
an air motor; a rotatable body driven by said motor;
a rotatable anvil having an impact receiving surface;
an impact element, having an impact delivering surface, disposed for longitudinal rectilinear movement in said body; said element being movable in one direction to move said impact delivering surface into the path of said impact receiving surface, and in the other direction to move said element out of said path; air operated means and spring means for effecting said movements of said impact element;
valve means defined by coacting valve elements rotated respectively with said body and said anvil, operative upon relative rotation thereof for controlling the air acting on said air operated means;
and a valve positioned adjacent to said motor for controlling the flow and the velocity pressure of air directed to said motor, independently of the air directed to said air operated means, to provide constant energy input to said motor.

6. In an air operated rotary impact wrench:
an air motor; a rotatable body driven by said motor;
a rotatable anvil having an impact receiving surface;
an axially movable impact element, disposed in said body, having an impact delivering surface; said element being movable in one direction to extend said impact delivering surface for engagement with said impact receiving surface, and in another direction to retract said element; pressure surface means associated with said element;
valve means defined by coacting valve elements rotated respectively with said body and said anvil, operative upon relative rotation thereof to alternately direct air to and vent air from said pressure surface means; said valve directed air effecting movement of said impact element in one of said directions; spring means for effecting movement of said impact element in the other of said directions;
and a valve positioned adjacent to said motor for controlling the flow and the velocity pressure of air directed to said motor, independently of the air directed to said pressure surface means, to provide constant energy input to said motor.

7. In an air operated rotary impact wrench:
an air motor; a rotatable body driven by said motor;
a rotatable anvil having an impact receiving surface;
an impact element, mounted for longitudinal rectilinear movement in said body, having an impact delivering surface; pressure surface means associated with said element;
valve means defined by coacting valve elements rotated respectively with said body and said anvil, operative upon relative rotation thereof to alternately direct air to said pressure surface means, to extend said element for impact engagement with said anvil, and to vent air from said pressure surface means, to permit retraction of said element out of the path of said anvil; spring means for effecting said retraction of said element;
and a valve positioned adjacent to said motor for controlling the flow and the velocity pressure of air directed to the motor, independently of the air directed to said pressure surface means, to provide constant energy input to said motor.

8. In an air operated rotary impact wrench:
an air motor; a rotatable body driven by said motor;
a rotatable anvil having an impact receiving surface lying in a generally radial plane;
an impact element, mounted for longitudinal rectilinear movement in said body, having an impact delivering surface lying in a generally radial plane relative to said body; pressure surface means associated with said element;
valve means defined by coacting valve elements rotated respectively with said body and said anvil, operative upon relative rotation thereof to alternately direct air to said pressure surface means, to extend said element for impact engagement with said anvil, and to vent air from said pressure surface means, to permit retraction of said element out of the path of said anvil; spring means for effecting said retraction of said element;
a valve positioned adjacent to said motor for controlling the flow and the velocity pressure of air directed to the motor, independently of the air directed to said pressure surface means, to provide constant energy input to said motor;
and means for supplying air to said valve means and to said motor valve.

9. In an air operated rotary impact wrench:
a vane type air motor; a rotatable body driven by said motor;
a rotatable anvil having an impact receiving surface;
an impact element, mounted for longitudinal rectilinear movement in said body, having an impact delivering surface; pressure surface means associated with said element;
valve means defined by coacting valve elements rotated respectively with said body and said anvil, operative upon relative rotation thereof to alternately direct air to said pressure surface means, to extend said element for impact engagement with said anvil, and to vent air from said pressure surface means, to permit retraction of said element out of the path of said anvil; spring means for effecting said retraction of said element;
means defining an air supply chamber adjacent to said motor; air passage means communicating said valve means with said supply chamber;
and an adjustable valve positioned adjacent to said motor for controlling the flow and the velocity pressure of air directed from said supply chamber to the vanes of said motor, independently of the air directed to said air passage means, to provide constant energy input to said motor.

10. An air operated rotary impact wrench comprising: an air motor mounted in the rearward end of said housing; a rotatable clutch body driven by said motor;
a rotatable anvil, mounted in the forward end of said housing, having an impact receiving surface lying in a generally radial plane and having a shaft extending rearwardly into said clutch body;
an impact delivering element, disposed in said clutch body for longitudinal rectilinear movement with respect thereto, having an impact delivering surface lying in a generally radial plane with respect to said rotatable body; a piston, operatively associated with said element, non-rotatably disposed in a piston chamber within said body; spring means for moving said piston and said element to a retracted position within said body in which the path of said element is spaced from the path of said impact receiving surface;
rotary valve means defined by said piston and said anvil shaft operative upon relative rotation thereof to alternately direct air to said piston chamber, to extend said impact delivering element for engagement of said impact delivering surface with said impact receiving surface, and to exhaust air from said chamber;
the housing of said motor having an air intake passage opening therefrom; and a velocity control valve adjustably mounted in said wrench housing for movement relative to said intake passage opening to control the flow and the velocity pressure of air directed to the motor, independently of the air directed to said piston chamber.

11. The invention set forth in claim 10 including means defining an air supply chamber communicating with said velocity control valve; and air passage means communicating said air supply chamber with said rotary valve means.

12. An air operated rotary impact wrench comprising a housing; a reversible air motor mounted in the rearward end of said housing; a rotatable clutch body driven by said motor;
a rotatable anvil, mounted in the forward end of said housing, having oppositely facing impact receiving surfaces lying in generally radial planes;
an impact delivering element, disposed in said clutch body for longitudinal rectilinear movement with respect thereto, having oppositely facing impact delivering surfaces lying in generally radial planes with respect to said rotatable body; said element being movable in one direction, to extend said impact delivering surfaces into the path of said impact receiving surfaces, and in another direction to retract said element from said path; spring means for moving said element in one of said directions; pressure surface means operatively associated with said element;
rotary valve means defined by said body and said anvil operative upon relative rotation thereof to alternately direct air to said pressure surface means, for moving said element in the other of said directions, and vent air from said pressure surface means;
the housing of said reversible motor having a pair of air intake passages opening therefrom for directing air to the driving side of the motor or, alternatively, exhausting secondary air from the driven side of the motor; a disc-like reversing valve disposed for rotational movement against said motor housing and defining, with said wrench housing, an air supply chamber; said reversing valve having ports for selective positioning, with respect to said motor intake passages, to communicate said intake passages with said air supply chamber;
a velocity control valve adjustably mounted in said wrench housing and extending into said supply chamber; said velocity control valve being adjustable relative to said reversing valve to control the flow of air from said supply chamber to one of said motor intake passages; and said velocity control valve controlling the velocity pressure of the air directed to said one intake passage for accurate control of the input energy to said motor.

13. An air operated rotary impact wrench comprising a housing; a reversible air motor mounted in the rearward end of said housing; a rotatable clutch body driven by said motor;
a rotatable anvil, mounted in the forward end of said housing, having oppositely facing impact receiving surfaces lying in generally radial planes and having a shaft extending rearwardly into said clutch body;
an impact delivering element, disposed in said clutch body for longitudinal rectilinear movement with respect thereto, having oppositely facing impact delivering surfaces lying in generally radial planes with respect to said rotatable body; a piston, operatively associated with said element, nonrotatably disposed in a piston chamber within said body; spring means for moving said piston and said element to a retracted position, within said body, in which the path of said element is spaced from the path of said impact receiving surfaces;

rotary valve means defined by said piston and said anvil shaft operative upon relative rotation thereof to alternately direct air to said piston chamber, to extend said impact delivering element for engagement of said impacting surfaces, and to exhaust air from said chamber;

the housing of said reversible motor having a pair of air intake passages opening therefrom for directing air to the driving side of the motor or, alternatively, exhausting secondary air from the driven side of the motor; a disc-like reversing valve disposed for rotational movement against said motor housing and defining, with said wrench housing, an air supply chamber; said reversing valve having ports for selective positioning, with respect to said motor intake passages, to communicate said intake passages with said air supply chamber;

a velocity control valve adjustably mounted in said wrench housing and extending into said supply chamber; said velocity control valve being adjustable relative to said reversing valve to control the flow of air from said supply chamber to one of said motor intake passages; said velocity control valve controlling the velocity pressure of the air directed to said one intake passage for accurate control of the input energy to said motor;

and air passage means communicating said air supply chamber with said rotary valve means.

14. In an air operated rotary impact wrench:

an air motor; a rotatable impact delivering assembly, driven by said motor, having a radially disposed impact delivering member;

a rotatable impact receiving assembly having a radially disposed impact receiving member;

one of said impact members being mounted in its associated assembly for longitudinal rectilinear movement into and out of the path of the other of said impact members; air actuated means in said one assembly for effecting said movement of said one impact member; said one impact member and said air actuated means defining an impact clutch in said one impact assembly;

valve means defined by coacting valve elements rotated respectively with each of said impact assemblies, operative upon relative rotation thereof to control the air acting on said air actuated means;

a direct drive clutch defined by coacting clutch elements rotated respectively with each of said impact assemblies; means urging said direct drive clutch elements into driving engagement to directly couple said impact assemblies; air actuated means for effecting disengagement of said direct drive clutch elements;

said impact clutch valve means and said air actuated means for said direct drive clutch being in communication with a common air supply; and a valve positioned adjacent to said motor for controlling the flow and velocity pressure of air directed to said motor, independently of the air directed to said impact clutch and said direct drive clutch, to provide constant energy input to said motor.

15. In an air operated rotary impact wrench:

an air motor; a rotatable body driven by said motor;

a rotatable anvil having an impact receiving surface;

an impact element, having an impact delivering surface, mounted in said body for longitudinal rectilinear movement into and out of the path of said impact receiving surface of said anvil; air actuated means, in said body, for effecting said movement of said impact element; said body, said impact element, and said air actuated means defining an impact clutch;

valve means defined by coacting valve elements rotated respectively with said body and said anvil, operative upon relative rotation thereof for controlling the air acting on said air actuated means;

a direct drive clutch defined by coacting clutch elements rotated respectively with said body and said anvil; means urging said direct drive elements into driving engagement; air actuated means for effecting disengagement of said direct drive clutch elements;

said impact clutch valve means and said air actuated means for said direct drive clutch being in communication with a common air supply; and a valve position adjacent to said motor for controlling the flow and velocity pressure of air direction to said motor, independently of the air directed to said impact clutch and said direct drive clutch, to provide constant energy input to said motor.

16. The invention set forth in claim 15 wherein said impact clutch includes spring means urging said impact element out of the path of said impact receiving surface; wherein said valve means for said impact clutch acts alternately to direct air to said air actuated means to move said impact element into said path, and to vent air from said air actuated means to effect said movement out of said path;

and wherein said direct drive clutch includes spring means urging said clutch elements into driving engagement; said spring means providing sufficient spring pressure to prevent disengagement of direct drive clutch elements until the air pressure at said impact clutch valve means is sufficient to fully extend said impact element into said path.

17. In a rotary impact wrench:

a motor; a rotatable impact delivering assembly, driven by said motor, having a radially disposed impact delivering member;

a rotatable impact receiving assembly having a radially disposed impact receiving member;

one of said impact members being mounted in its associated assembly for movement into and out of the path of the other of said impact members; air actuated means in said one assembly for effecting said movement of said one impact member; said one impact member and said air actuated means defining an impact clutch in said one impact assembly;

valve means defined by coacting valve elements rotated respectively with each of said impact assemblies, operative upon relative rotation thereof to control the air acting on said air actuated means of said impact clutch;

a direct drive clutch defined by coacting clutch elements rotated respectively with each of said impact assemblies; means urging said direct drive clutch elements into driving engagement to directly couple said impact assemblies; air actuated means for effecting disengagement of said direct drive clutch elements;

and valve means for selectively directing air to the air actuated means for said direct drive clutch, for selecting either direct drive or impact drive of said impact receiving assembly.

18. In a rotary impact wrench:

a motor; a rotatable body driven by said motor;

a rotatable anvil having an impact receiving surface;

an impact element, having an impact delivering surface, mounted in said body for movement into and out of the path of said impact receiving surface of said anvil; air actuated means, in said body, for effecting said movement of said impact element; said body, impact element, and said air actuated means defining an impact clutch;

valve means defined by coacting valve elements rotated respectively with said body and said anvil, operative upon relative rotation thereof to control the air acting on said air actuated means of said impact clutch;

a direct drive clutch defined by coacting clutch elements rotated respectively with said body and to said anvil;

means urging said direct drive clutch elements into driving engagement; air actuated means for effecting disengagement of said direct drive clutch elements;

and valve means for selectively directing air to said air actuated means of said direct drive clutch, to select either direct drive or impact drive of said anvil.

19. The invention set forth in claim 18 including means defining an air chamber; air passage means communicating said air chamber with said valve means for said impact clutch and with said air actuated means for said direct drive clutch;

and said selectively operable valve means being disposed in said air passage means.

20. The invention set forth in claim 18 wherein said impact clutch includes spring means urging said impact element out of the path of said impact receiving surface; wherein said valve means for said impact clutch acts alternately to direct air to said air actuated means to move said impact element into said path, and to vent air from said air actuated means to effect said movement out of said path; and wherein said direct drive clutch includes spring means urging said clutch elements into driving engagment.

21. The invention set forth in claim 20 wherein said motor is an air operated motor; and said motor being communicated with said air chamber by air passage means independent of said selectively operable valve means.

References Cited by the Examiner
UNITED STATES PATENTS

| | | | |
|---|---|---|---|
| 2,425,793 | 8/47 | Fosnot | 81—52.3 X |
| 2,476,632 | 7/49 | Shaff | 192—.096 |
| 2,693,867 | 11/54 | Maurer | 192—.096 X |
| 2,725,961 | 12/55 | Maurer | 192—.096 |
| 2,727,598 | 12/55 | Mitchell et al. | 192—.096 X |
| 2,783,863 | 3/57 | Shaff | 192—30.5 |
| 2,784,818 | 3/57 | Maurer | 81—53.3 X |
| 3,068,973 | 12/62 | Maurer | 192—.096 |

DON A. WAITE, *Primary Examiner*.

UNITED STATES PATENT OFFICE
CERTIFICATE OF CORRECTION

Patent No. 3,181,672                                    May 4, 1965

Roger I. Swanson

It is hereby certified that error appears in the above numbered patent requiring correction and that the said Letters Patent should read as corrected below.

Column 13, line 56, after "comprising" insert -- a housing --.

Signed and sealed this 21st day of December 1965.

(SEAL)
Attest:

ERNEST W. SWIDER                                    EDWARD J. BRENNER
Attesting Officer                                          Commissioner of Patents